US010152785B2

(12) United States Patent
Kingston et al.

(10) Patent No.: US 10,152,785 B2
(45) Date of Patent: Dec. 11, 2018

(54) POSITIONAL ERROR CORRECTION IN A TOMOGRAPHIC IMAGING APPARATUS

(71) Applicant: FEI Company, Hillsboro, OR (US)

(72) Inventors: Andrew Kingston, Kambah (AU); Shane Latham, Griffith (AU); Adrian Sheppard, Fisher (AU); Benoit Recur, Turner (AU); Trond Karsten Varslot, Vuku (NO)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 15/221,524

(22) Filed: Jul. 27, 2016

(65) Prior Publication Data

US 2017/0061610 A1   Mar. 2, 2017

(30) Foreign Application Priority Data

Aug. 24, 2015 (EP) ...................................... 15182129

(51) Int. Cl.
 *G06K 9/00* (2006.01)
 *G06T 7/00* (2017.01)
 *G06T 11/00* (2006.01)

(52) U.S. Cl.
 CPC .......... *G06T 7/0012* (2013.01); *G06T 7/0024* (2013.01); *G06T 11/003* (2013.01); *G06T 11/005* (2013.01); *G06T 2207/10072* (2013.01)

(58) Field of Classification Search
 CPC ................. G06T 11/003; G06T 11/005; G06T 2207/10072; G06T 7/0012
 See application file for complete search history.

(56) References Cited

U.S. PATENT DOCUMENTS

| 6,837,892 | B2 * | 1/2005 | Shoham | ............. | A61B 17/1757 |
| | | | | | 606/130 |
| 2003/0161443 | A1 * | 8/2003 | Xiao | ..................... | G06T 11/006 |
| | | | | | 378/210 |
| 2004/0076319 | A1 * | 4/2004 | Fauver | ............... | G01N 15/1468 |
| | | | | | 382/133 |

(Continued)

OTHER PUBLICATIONS

"Cone Beam Computed Tomography", Wikipedia, Retrieved from the Internet Aug. 4, 2016, https://en.wikipedia.org/wiki/Cone_beam_computed_tomography, 8 pages.

(Continued)

*Primary Examiner* — Li Liu
(74) *Attorney, Agent, or Firm* — Scheinberg & Associates, P.C.; Michael O. Scheinberg

(57) ABSTRACT

A method for investigating a specimen using a tomographic imaging apparatus, comprising acquiring a set of input images of the specimen taken at a corresponding set of source positions that are intended to lie on an ideal locus but are instead caused by positioning errors to lie on a distorted locus, using the images to construct an initial tomographic image, dissociating the initial tomographic image into a set of reference images referenced to said ideal locus, comparing the given input images to the corresponding reference images, calculating a set of transformations necessary to map the input images onto the reference images, and using the set of transformations to construct a modified tomographic image.

20 Claims, 5 Drawing Sheets

(56) References Cited

U.S. PATENT DOCUMENTS

| | | | |
|---|---|---|---|
| 2012/0196320 A1* | 8/2012 | Seibel | G01N 1/30 |
| | | | 435/40.52 |
| 2012/0301004 A1* | 11/2012 | Kingston | A61B 6/032 |
| | | | 382/131 |
| 2015/0069231 A1 | 3/2015 | Luecken et al. | |
| 2016/0363544 A1* | 12/2016 | Tagawa | G01N 23/046 |
| 2017/0052264 A1 | 2/2017 | Kingston et al. | |

OTHER PUBLICATIONS

"Electron Microscope", Wikipedia, Retrieved from the Internet Oct. 15, 2015, http://en.wikipedia.org/wiki/Electron_microscope, 11 pages.
"Focused Ion Beam", Wikipedia, Retrieved from the Internet Jul. 11, 2016, https://en.wikipedia.org/wiki/Focused_ion_beam, 7 pages.
"Nanotomography", Wikipedia, Retrieved from the Internet Aug. 4, 2016, from https://en.wikipedia.org/wiki/Nanotomography, 1 page.
"Scanning Electron Microscope", Wikipedia. Retrieved from the Internet Jul. 25, 2016, http://en.wikipedia.org/wiki/Scanning_electron_microscope, 23 pages.
"Scanning Helium Ion Microscope", Wikipedia, Retrieved from the Internet on Jul. 25, 2016, http://en.wikipedia.org/wiki/Scanning_Helium_Ion_Microscope, 2 pages.
"Scanning Transmission Electron Microscopy", Wikipedia, Retrieved from the Internet Jul. 25, 2016, http://en.wikipedia.org/wiki/Scanning_transmission_electron_microscopy, 5 pages.
"Spiral Computed Tomography", Wikipedia, Retrieved from the Internet Aug. 4, 2016, https://en.wikipedia.org/wiki/Spiral_computed_tomography, 2 pages.
"Transmission Electron Microscopy", Wikipedia, Retrieved from the Internet Jul. 25, 2016, http://en.wikipedia.org/wiki/Transmission_electon_microscopy, 23 pages.
"X-Ray Microtomography", Wikipedia, Retrieved from the Internet Aug. 4, 2016, https://en.wikipedia.org/wiki/X-ray_microtomography, 5 pages.
Parkinson, D., et al. "Automatic alignment and reconstruction of images for soft X-ray tomography," Journal of Structural Biology, Feb. 2012, pp. 259-266, vol. 177, Issue 2, 2011 Elsevier Inc.
Escovitz, W.H. et al., "Scanning Transmission Ion Microscope with a Field Ion Source," Proc. Nat. Acad. Sci. USA, May 1975, pp. 1826-1828, vol. 72, No. 5.
Neuser, E., et al. "NanoCT® Visualizing internal 3D structures with submicrometer resolution", DIR 2007, 18 p, vol. 39 Issue 41, International symposium on digital industrial radiology and computed tomography, France.
Varentsov, D. et al. "First biological images with high-energy proton microscopy", Physica Medica (2013), pp. 208-213, vol. 29.

* cited by examiner

POSITIONAL ERROR CORRECTION IN A TOMOGRAPHIC IMAGING APPARATUS

The invention relates to a method of investigating a specimen using a tomographic imaging apparatus comprising:
A specimen holder, for holding the specimen;
A source, for producing a beam of radiation that can be directed at the specimen;
A detector, for detecting a flux of radiation transmitted through the specimen from the source;
A stage apparatus, for producing relative motion (positioning) of the source with respect to the specimen, so as to allow the source and detector to image the specimen along a series of different viewing axes;
A processing apparatus, for assembling output from the detector into a tomographic image of at least part of the specimen.

The invention also relates to a tomographic imaging apparatus that can be used in performing such a method.

The invention further relates to a charged-particle microscope provided with such a tomographic imaging apparatus.

In tomographic imaging (also referred to as Computed Tomography (CT)) as referred to above, the source and (diametrically opposed) detector are used to look through the specimen along different lines of sight (viewing axes), so as to acquire penetrative observations of the specimen from a variety of perspectives; these are then used as input to a mathematical procedure that produces a reconstructed "volume image" of (part of) the (interior of) the specimen. In order to achieve a series of different lines of sight as alluded to here, one can, for example, choose to:
(a) Keep the source and detector static and move the specimen relative to them;
(b) Keep the specimen static and move the source relative to it. In this case, one can elect to:
Move the detector in synchronization with the source; or
Embody the detector as a (static) array of sub-detectors, with positions matched to correspond to the different positions to be assumed by the source.
Regardless of whether the source or specimen is moved, it is possible to describe their relative motion using (for example) a specimen-centric coordinate system/reference frame. The beam of radiation that traverses the specimen can, for example, be regarded as being cone-like (thus yielding so-called cone beam tomography) or resembling a segment of a disc (thus yielding so-called fan beam tomography), depending on the geometry/shape that the detector "presents" to the source; a parallel/collimated beam is also possible. The "viewing axis" alluded to here can be regarded as corresponding to an "optical axis" along which the beam (from source through specimen to detector) propagates; it basically corresponds to the position of a central/median/core ray in that beam. In order to achieve sufficient sample penetration, the employed radiation will generally comprise X-rays.

Tomographic imaging as referred to here can be performed using a standalone apparatus, which is conventionally the case in medical imaging applications, for example, where the specimen (e.g. a human or animal) is macroscopic. Standalone CT tools are also available for performing so-called "micro CT", in which a micro-focused source is used to image microscopic specimens, e.g. in geology/petrology, biological tissue studies, etc. Continuing this drive toward ever-greater resolution, so-called "nano CT" instruments have also been developed; these may be standalone tools, but, for example, they may also be embodied as (add-on) modules for (a vacant vacuum/interface port of) a charged-particle microscope (CPM), in which case the CPM's charged-particle beam is used to irradiate a metal target, causing production of the Bremsstrahlung X-rays used to perform the desired tomography (see FIG. 5B, for example). More information on (some) of these topics can, for example, be gleaned from the following references:
en.wikipedia.org/wiki/X-ray_microtomography
en.wikipedia.org/wiki/Nanotomography
ndt.net/article/dir2007/papers/24.pdf
It should be noted that, as referred to here in the context of a CPM, the phrase "charged particle" should be broadly construed as encompassing:
Electrons, as in the case of a Transmission Electron Microscope (TEM), Scanning Electron Microscope (SEM), and Scanning Transmission Electron Microscope (STEM), for instance. See, for example, the following references:
en.wikipedia.org/wiki/Electron_microscope
en.wikipedia.org/wiki/Scanning_electron_microscope
en.wikipedia.org/wiki/Transmission_electron_microscopy
en.wikipedia.org/wiki/Scanning_transmission_electron_microscopy
Ions, which may be positive (e.g. Ga or He ions) or negative. Such ion beams can be used for imaging purposes, but they are also often used for surface modification purposes, e.g. as in the case of Focused Ion Beam (FIB) milling, Ion-Beam-Induced Deposition (IBID), Ion-Beam-Induced Etching (IBIE), etc. See, for example, the following references:
en.wikipedia.org/wiki/Focused_ion_beam
en.wikipedia.org/wiki/Scanning_Helium_Ion_Microscope
W. H. Escovitz, T. R. Fox and R. Levi-Setti, *Scanning Transmission Ion Microscope with a Field Ion Source*, Proc. Nat. Acad. Sci. USA 72 (5), pp 1826-1828 (1975).
Other charged particles, such as protons and positrons, for instance. See, for example, the following reference:
ncbi.nlm.nih.gov/pubmed/22472444
It should also be noted that, in addition to imaging and/or surface modification, a charged particle beam in a CPM may also have other functionalities, such as performing spectroscopy, examining diffractograms, etc.

As regards the specimen/source relative motion employed to achieve different lines of sight/viewing axes, use is conventionally made of:
A circular scan, in which the source follows a planar (relative-motion) orbit about the specimen, and images are captured at a high sampling rate (i.e. quasi-continuously) along this orbit. This type of circular acquisition locus can be applied in situations where only a relatively thin "slice" of a specimen has to be imaged, e.g. when making a cone beam CT scan of human dentition. See, for example, the following reference:
en.wikipedia.org/wiki/Cone_beam_computed_tomography
A helical scan, in which the source follows a coil-like/spiral (relative-motion) path about a (longitudinal) axis of the specimen, and images are again captured at a high sampling rate (i.e. quasi-continuously) along this path. This type of helical acquisition locus can be applied in situations where a relatively elongated portion of a specimen has to be imaged, e.g. when making a CT scan of (a portion of) a human vertebral column. It is typically achieved by combining circular motion (e.g. of the source) and concurrent translational motion (e.g. of the specimen). See, for example, the following reference:
en.wikipedia.org/wiki/Spiral_computed_tomography As an alternative to conventional curvilinear loci—such as the circular/spiral scan paths just referred to—one can, for example, also make use of a lattice-like data acquisition locus, e.g. as set forth in co-pending European Patent Application EP15181202.1 (FNL1515). Regardless of the chosen source/specimen relative positioning path, the sampling positions (input imaging positions) associated with a given tomographic imaging session are generally assumed to lie on an ideal locus. In practice, however, positioning errors (e.g. associated with stage/frame vibrations, hysteresis, thermal expansion/contraction, beam alignment drift, unintended source motion, unwanted specimen shift on the specimen holder, etc.) cause the actual sampling positions to deviate from their intended coordinates, and instead lie on a distorted locus. For example, considering the specific case of a helical scanning path, what should ideally be a smooth helix (see left of FIG. 2, for example) is instead typically distorted into a jittery/jagged pseudo-helix (see right of FIG. 2, for example). This effect leads to (inhomogeneous) blurring/resolution-loss in the associated reconstructed tomogram, which may accordingly tend to exhibit phenomena such as "double edging" and "streaking".

It is an object of the invention to address the issues referred to above. More specifically, it is an object of the invention to provide a tomographic imaging technique that corrects for the effects of positioning errors during data acquisition. In particular, it is an object of the invention that this novel technique should enable tomographic reconstruction of improved quality/sharpness to be performed.

These and other objects are achieved in a method as set forth in the opening paragraph above, which method is characterized by the following steps:
(i) Acquiring a set of input images of the specimen taken at a corresponding set of source positions relative to the specimen, which source positions are intended to lie on an ideal locus but are instead caused by positioning errors to lie on a distorted locus;
(ii) Using said input images to construct an initial tomographic image;
(iii) Dissociating said initial tomographic image into a set of reference images referenced to said ideal locus;
(iv) Comparing given input images to corresponding reference images, and calculating a set of transformations necessary to map the former onto the latter;
(v) Using said set of transformations to construct a modified tomographic image.
The basic ideology underlying this inventive approach can be explained as follows:
Even though the input images are (generally) acquired at deviant locus coordinates (compared to the ideal locus on which they are intended to lie), they nevertheless are adequate to construct an initial tomogram. This initial tomogram need only be of relatively low resolution. Because of averaging effects, any relatively large features in the initial tomogram will—on the whole—not have suffered much from the aforementioned positioning errors; however, relatively small features (including the edges of relatively large features) will be more significantly affected. It should be mentioned that, if desired, this initial tomogram may, for example, be derived by deliberately blurring/coarsening a finer-resolution progenitor tomogram, or by applying coarse downsampling/binning to relatively fine initial data.
Just as input images (in physical space) can be converted into a tomogram (in mathematical space), one can also convert a tomogram into an associated set of predicted theoretical input images. This process is called "forward projection" or "re-projection". In principle, such "dissociation" (deconvolution/disentanglement) of the tomogram can occur onto any chosen mathematical "scaffold" (selected series of viewing angles); consequently, using said relatively large features as pegs/anchors, one can re-project the initial tomogram onto the aforementioned ideal locus.
As already set forth above, relatively large features in the re-projected images (which can now act as reference images) will (on average) be recognizable and have the same proportions as on the distorted locus. However, smaller features typically will not. For a given (small) feature, one can now compare an actual input image and a corresponding reference image so as to determine a (vector) positional error (of the former image relative to the latter) for the feature in question. Repeating this process for a collection of features (comprised in at least a subset of the input images/reference images) allows calculation of a mathematical (coordinate/geometric) transformation/mapping that—when applied to a given input image—will "convert" it into the corresponding reference image.
Using this calculated set of transformations, it becomes possible to construct a modified (corrected/improved/resolution-altered) tomogram. This can be realized in different ways—for example:
If one is using a reconstruction technique that inherently relies on a particular acquisition strategy—such as the Feldkamp Davis Kress (FDK) Back Projection algorithm—then the set of transformations resulting from step (iv) can first be used in an intermediate step to produce a set of corrected input images, which are then used to construct the modified tomogram of step (v);
If one is using a reconstruction algorithm that allows specification of a particular locus for each projection—e.g. an iterative reconstruction technique (such as ART, DART, SIRT, DIRT, MGIR, etc.)—then the intermediate step (production of corrected input images) referred to in the previous item is unnecessary, and one can instead directly manipulate ("tweak") parameters of the reconstruction procedure/algorithm used in step (ii) [by applying a corrected assumed locus], so as to produce a modified tomogram.
It should be noted that the transformations resulting from step (iv) may, if desired, be modified before application in step (v), e.g. by multiplying them by a reduction factor (or other "filter factor"), for instance.
This inventive approach can (in many circumstances) produce a dramatic improvement in the quality of the attainable tomogram: compare, for example, FIGS. 3A & 3B and FIGS. 4A & 4B (discussed in more detail below).
In addition, the following aspects of the invention deserve explicit mention:
Performing re-projection on a relatively coarse scale has certain distinct advantages, such as:
Reduction of Computational Overhead: as a rule of thumb, coarsening by a factor of two tends to reduce computation time by a factor of eight. Accordingly, the method lends itself to use with large datasets.
Improved Image Comparison: coarsening tends to eliminate (or at least greatly reduce) so-called "double-edge (motion blur) artifacts", allowing more accurate/definite comparison of re-projected reference images with the original input images.
Because a relatively coarse re-projection can be used to (ultimately) distill a relatively fine-scale positional correction, the present technique can be regarded as being "multi-scale" or "multi-grid" in nature.

The coarseness of the re-projection can be chosen in accordance with the (expected) type of positioning errors in the input images. High-frequency, uncorrelated, jitter-like fluctuations will—on a given image acquisition timescale—tend to average out more than lower-frequency, drift-like fluctuations. The multi-grid aspect of the present invention allows this effect to be addressed by, for example, increasing the chosen coarseness of the re-projection when dealing with lower-frequency fluctuations, so as to improve averaging effects.

As a further note regarding the discussion in the previous paragraph, it should be realized that forward projection per se is a technique that is, for example, practiced in iterative tomographic reconstruction schemes, in which one "oscillates" back-and-forth in iterative cycles between physical space (input images) and mathematical space (tomogram imagery), applying various "polishing" techniques in each iteration (such as filtering/constraining) so as to gradually converge toward an acceptable result. In this context, the term "forward projection" may be seen as being the opposite (mathematical adjoint operation) of "back projection", which is a procedure whereby an image of a specimen, taken along a given viewing axis, is back-projected (smeared out) along that viewing axis, through the specimen; when this is done for several appropriately chosen viewing axes, the various back-projected images will intersect and form a blurry image at the location of the specimen, which blurry image then forms a basis for subsequent reconstructive processing. Although forward projection is a known technique, it has not previously been used in the multi-scale way in which it is employed in the present invention, where a forward-projected reference is used to perform a posteriori (ex post facto) quantification of positioning errors associated with "corrupted" input images, which quantified errors are then used as a basis to reconstruct a modified tomogram.

In a particular embodiment of the present invention, steps (iii) to (v) above are repeated in iterative cycles, the modified tomographic image emerging from a preceding ($n^{th}$) cycle being used as the initial tomographic image entering a subsequent ($n^{th}+1$) cycle. This may, for example, be done so as to produce modified tomographic images of successively altered resolution (e.g. with a progression to finer resolution; or with a progression to coarser resolution, if one wants to deliberately blur an image, for instance). Alternatively, a given resolution level could be (approximately) maintained across multiple iterations, with successive tomographic images converging toward a "truer" end result in terms of content/form. Such an embodiment can, for example, be regarded as being a hybrid of the current invention and an iterative reconstruction technique as referred to in the previous paragraph, which techniques can be modified so as to include the inventive a posteriori modification/correction on a per-cycle basis, progressing successively toward an end goal.

It should be noted that the positional deviations referred to above are typically expected to produce "lower-order" imaging distortions, such as shift, rotation and scaling, which can be defined/described using affine matrices. "Higher-order" distortions, such as shear, skew and "lensing" (e.g. spherical, cylindrical or saddle-like deformation), are typically not expected to be a (significant) result of such positional deviations.

The invention will now be elucidated in more detail on the basis of exemplary embodiments and the accompanying schematic drawings, in which:

FIG. 1 renders a perspective view of a specimen undergoing tomographic imaging, and serves to explain certain (reference) geometric aspects of the current invention.

Figure 5B:
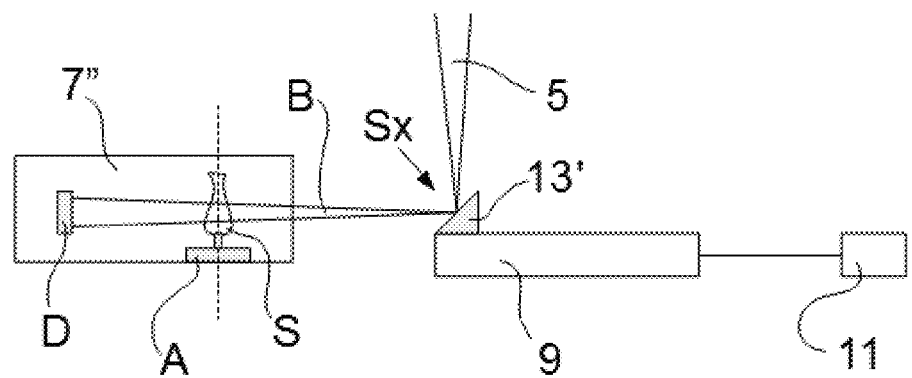
Figure 5A:
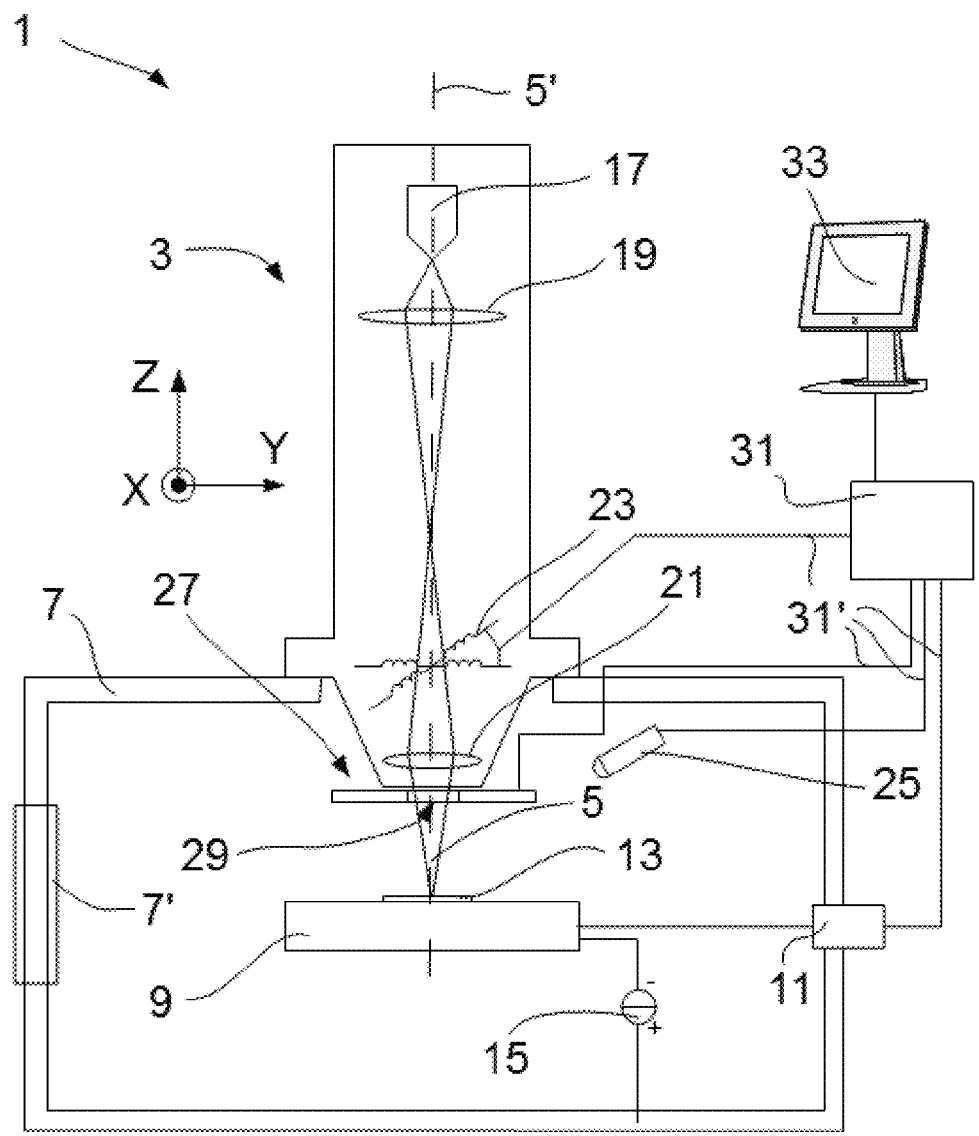

FIG. 5A renders a longitudinal cross-sectional elevation of a particular type of CPM in which an embodiment of the current invention can be carried out using a CT module.

FIG. 5B illustrates a CT module suitable for use in a CPM such as that shown in FIG. 5A.

EMBODIMENT 1

Figure 1:
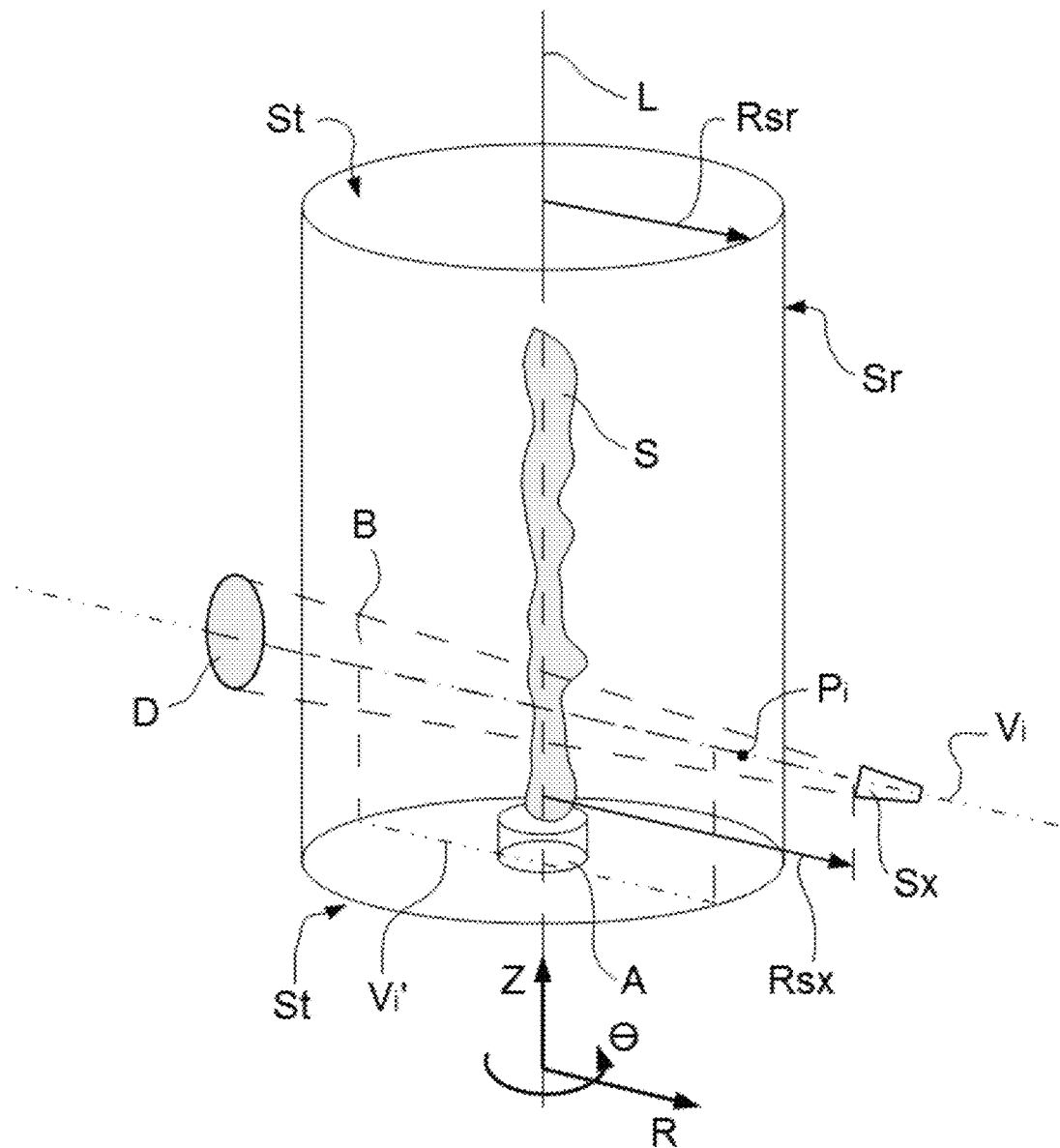

FIG. 1 renders a perspective view of a specimen S undergoing tomographic imaging, and serves to explain certain general/geometric aspects of the current invention. In the Figure, an elongated specimen S (which may be macroscopic, micron-scale, or nanometer-scale, for example) has an associated longitudinal axis L. A radiation source Sx produces a (cone- or fan-shaped) beam B of radiation (typically X-rays) that propagates along an axis $V_i$, which may be regarded as a viewing axis or line of sight. As here illustrated, $V_i$ is substantially normal to longitudinal axis L. Having traversed a portion of the specimen S, the beam B impinges upon a (diametrically opposed) detector D, which may, for example, be a Silicon Drift Detector (SDD), Silicon Lithium (Si(Li)) detector, or other suitable detector. This detector D forms an electronic image of said portion of the specimen S, which can be stored in an electronic memory. This procedure is then repeated for a series of different viewing axes $V_i$, allowing the specimen S to be viewed along different lines of sight; thereafter, the various images acquired in this manner are used as input to a mathematical reconstruction procedure to produce a tomogram. The various viewing axes $V_i$ are achieved by employing a stage apparatus to produce relative motion between the source Sx and specimen S, e.g. by producing translational/rotational motion of the source Sx/detector D and/or the specimen S in a pre-determined way. Such stage apparatus may, for example, comprise one or more linear motors, piezoelectric actuators, stepper motors, voice coil motors, pneumatic/hydraulic actuators, etc., and can readily be tailored by the skilled artisan to suit the needs of a given setup. In the specific embodiment depicted here, stage apparatus A can translate/rotate specimen S relative to source Sx/detector D.

Also shown in the Figure is a virtual reference surface Sr, which, in this case, is a cylindrical surface whose cylindrical axis coincides with longitudinal axis L. This reference surface Sr has a radius Rsr, chosen to be (approximately) equal to the distance Rsx of the source Sx from the axis L. The viewing axis $V_i$ intersects this reference surface Sr at intersection point $P_i$. Note that, if viewing axis $V_i$ is projected linearly along L, it will coincide with a diameter of a virtual disc-shaped terminal surface St at butt ends of the surface Sr. Associated with the reference surface Sr is a cylindrical coordinate system (R, θ, Z).

Figure 2:
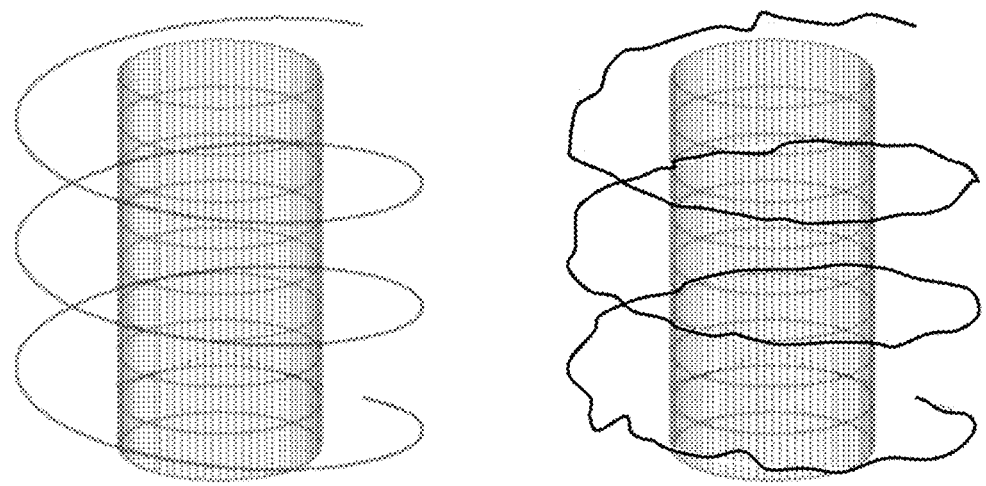
FIG. 2 illustrates an example of an ideal helical locus (left) and a distorted helical locus (right), the distortions in the latter being due to positioning errors/deviations in its constituent points.

The set $\{P_i\}$ of intersection points $P_i$ corresponding to the abovementioned series of viewing axes $V_i$ can be regarded as representing the locus alluded to in the context of the current invention. As already indicated above, such a locus may, for example, take the form of a circular or helical path, or a uniform lattice network, for instance. In this context, a distinction can be made between an ideal locus (in which all points $P_i$ lie exactly in their theoretically intended position) and a distorted locus (in which at least some of the points $P_i$ deviate from their theoretically intended positions, due to positioning errors as described above). This distinction is illustrated in FIG. 2, in which the left half of the Figure shows an ideal helical locus, whereas the right half of the Figure shows a distorted helical locus, which is jagged/jittery compared to its ideal counterpart. In a distorted locus, positional excursions/deviations from the associated ideal locus may, for example, be of the order of a couple of microns for a micro CT instrument.

Making use of (non-limiting) reference to FIGS. 1 and 2, the present invention can be explained as follows:

(i) Data Acquisition/Sampling:

A set of input images of the specimen S is acquired for source positions (intersection points $P_i$) that lie on a positionally distorted locus such as that on the right hand side of FIG. 2.

(ii) Initial Reconstruction:

Using the input images acquired in step (i), an initial tomographic image is produced. Because of the positional distortions inherent in the non-ideal sampling locus used in (i), this initial tomogram will be (locally) blurry/aberrated.

(iii) Forward Projection:

The initial tomogram resulting from step (ii) is forward-projected—at relatively low resolution—from "mathematical space" back into "projection space". However, this forward projection occurs onto an ideal locus (left hand side of FIG. 2) rather than the actual distorted locus used in step (i). This produces "reference images" on an ideal mathematical "reference scaffold".

(iv) Comparison; Calculation of Transformations:

The input images used in step (i) [or at least a subset thereof] are compared to their corresponding reference images from step (iii). Relatively large image features will—on average—be readily recognizable and have the same proportions in both types of image, but smaller features will tend to show positional deviations between both types of images. Examination of these positional deviations allows calculation of a mathematical transformation necessary to perform a mapping of a given input image onto its corresponding reference image (or vice versa).

(v) Tomogram Modification:

Using the set of transformations resulting from step (iv), the initial tomogram resulting from step (ii) can be modified, because one will have quantified the positional errors in (the distorted locus used to acquire) its constitutional input images.

Figure 3A:
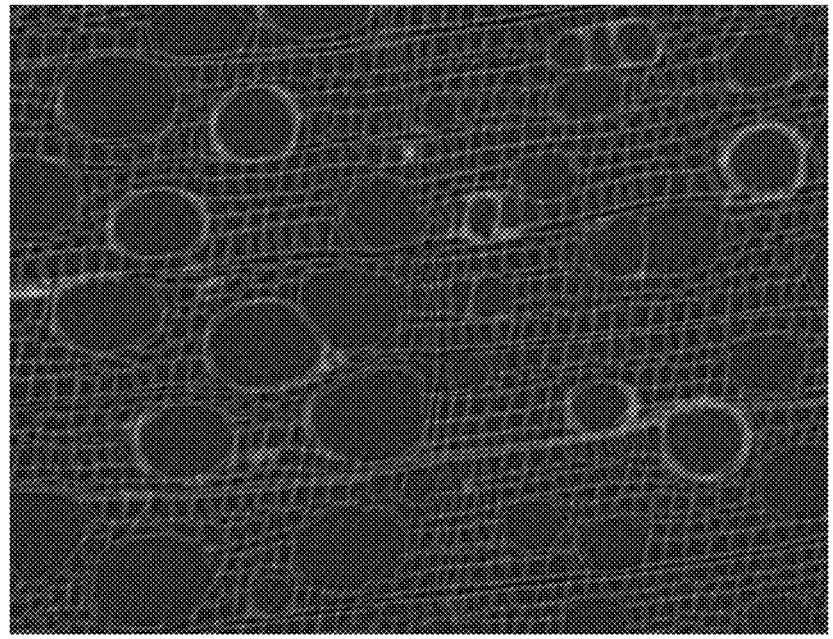
FIG. 3A shows a slice taken from a tomogram of a biological specimen, without application of the corrective method according to the present invention.

The corrective/de-blurring/sharpening effect of the present invention is immediately evident from a comparison of FIGS. 3A and 3B, as follows:

FIG. 3A shows a slice taken from a conventional tomogram of a biological specimen, comprising willow tissue. The voxel size is ca. 800 nm. The image is substantially blurred, and demonstrates the "double edging" referred to above.

Figure 3B:
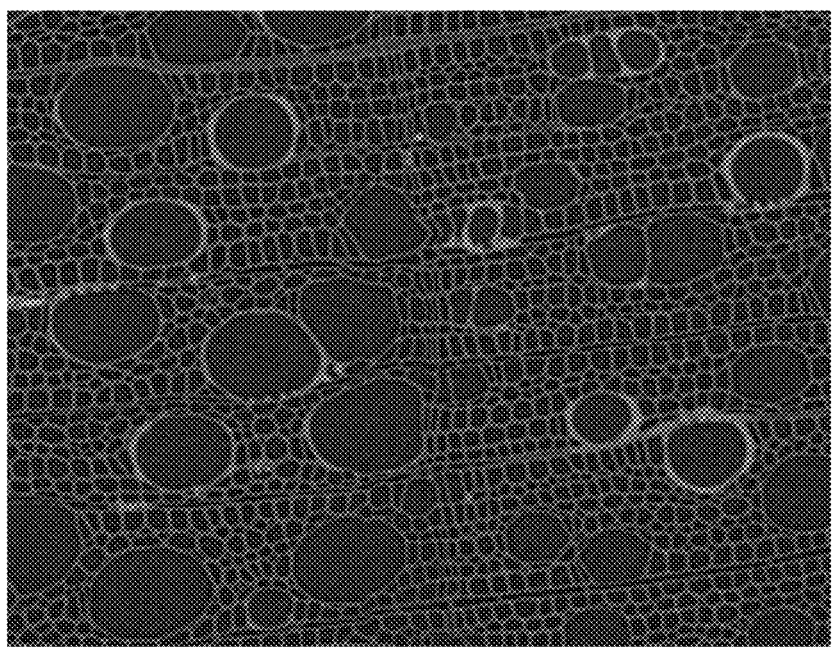
FIG. 3B shows the subject of FIG. 3A, after application of the corrective method according to the present invention.

FIG. 3B shows the subject of FIG. 3A, after application of the corrective method according to the present invention. This image is much clearer than the subject of FIG. 3A, and is substantially free of double edging.

Figure 4A:
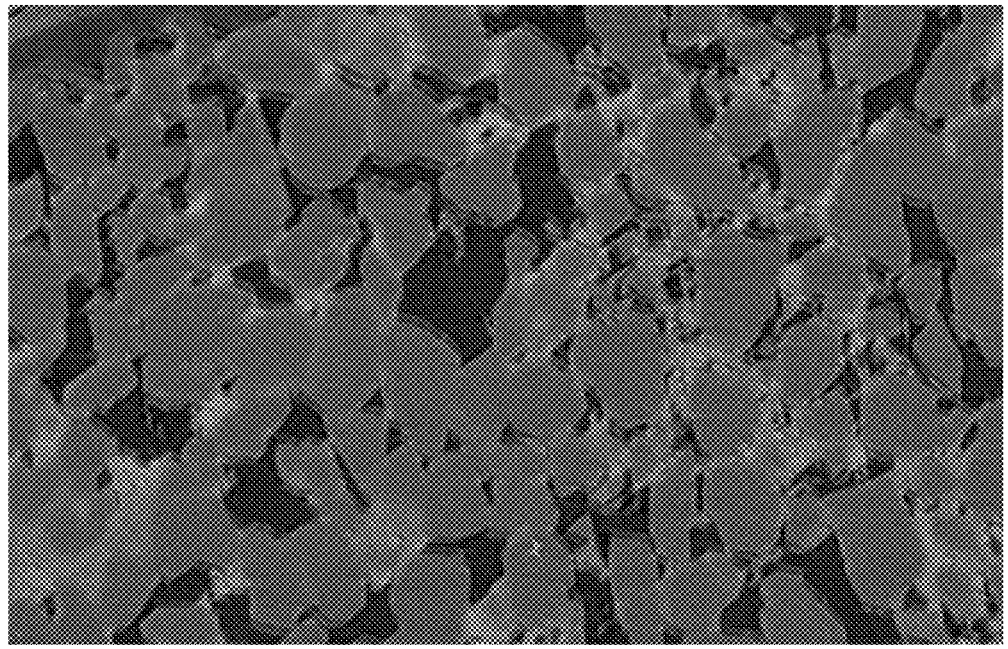
FIG. 4A shows a slice taken from a tomogram of a mineralogical specimen, without application of the corrective method according to the present invention.
Figure 4B:
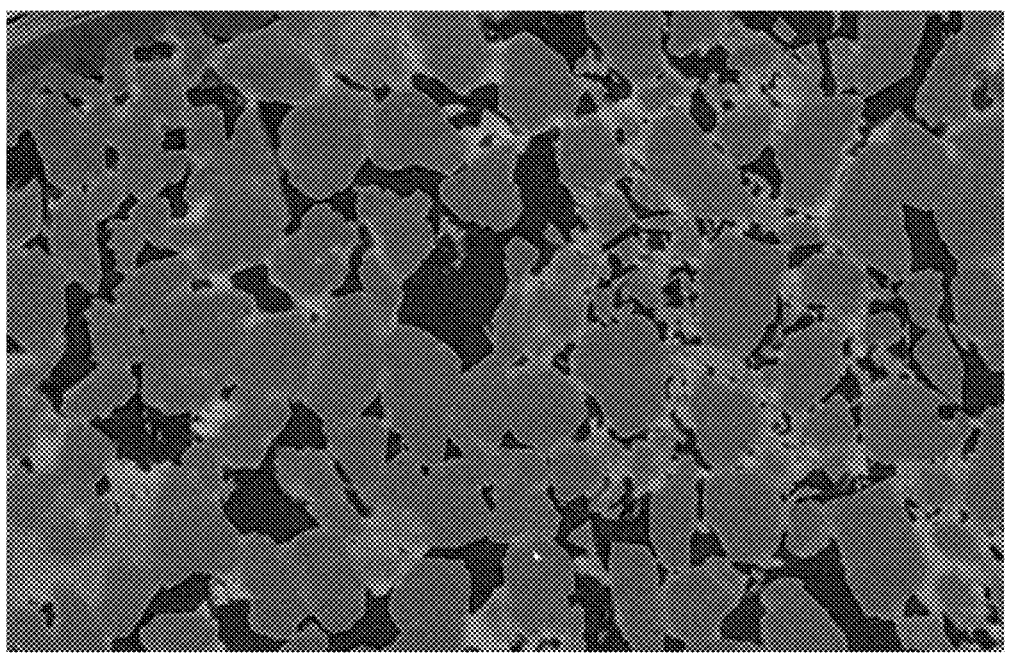
FIG. 4B shows the subject of FIG. 4A, after application of the corrective method according to the present invention.

A similar comparison can be made between FIG. 4A (raw/un-modified) and FIG. 4B (modified using the present invention), which show a mineralogical specimen comprising sandstone grains (voxel size ca. 4 µm).

EMBODIMENT 2

FIG. 5A is a highly schematic depiction of an embodiment of a CPM 1 that can be used in conjunction with the present invention; more specifically, it shows an embodiment of a SEM—though, in the context of the current invention, it could just as validly be an ion-based microscope, for example, or a TEM, for instance. The microscope 1 comprises a particle-optical column/illuminator 3, which produces a beam 5 of charged particles (in this case, an electron beam) that propagates along a particle-optical axis 5'. The particle-optical column 3 is mounted on a vacuum chamber 7, which comprises a specimen holder 9 and associated stage/actuator 11 for holding/positioning a specimen 13. The vacuum chamber 7 is evacuated using vacuum pumps (not depicted). With the aid of voltage source 15, the specimen holder 9, or at least the specimen 13, may, if desired, be biased (floated) to an electrical potential with respect to ground.

The particle-optical column 3 comprises an electron source 17 (such as a Schottky emitter), (electrostatic/magnetic) lenses 19, 21 (in general, more complex in structure than the schematic depiction here) to focus the electron beam 5 onto the specimen 13, and a deflection unit 23 to perform beam deflection/scanning of the beam 5. When the beam 5 impinges on/is scanned across the specimen 13, it will precipitate emission of various types of "stimulated" radiation, such as backscattered electrons, secondary electrons, X-rays and cathodoluminescence (infra-red, visible and/or ultra-violet photons); one or more of these radiation types can then be sensed/recorded using one or more detectors, which may form an image, spectrum, diffractogram, etc., typically by assembling a "map" (or "matrix") of detector output as a function of scan position on the specimen. The present Figure shows two such detectors, 25, 27, which may, for example, be embodied as follows:

Detector 25 may, for example, be an electron detector (such as an Solid State Photo-Multiplier), X-ray detector (such as an SDD or Si(Li) sensor) or a light detector (such as a photodiode).

Detector 27 is a segmented electron detector, comprising a plurality of independent detection segments (e.g. quadrants) disposed about a central aperture 29 (allowing passage of the beam 5). Such a detector can, for example, be used to investigate (the angular dependence of) a flux of output (secondary or backscattered) electrons emerging from the specimen 13.

These are just examples, and the skilled artisan will understand that other detector types, numbers and geometries/configurations are possible.

The microscope 1 further comprises a controller/computer processing unit 31 for controlling inter alia the lenses 19 and 21, the deflection unit 23, and detectors 25, 27, and displaying information gathered from the detectors 25, 27 on a display unit 33 (such as a flat panel display); such control occurs via control lines (buses) 31'. The controller 31 (or another controller) can additionally be used to perform various mathematical processing, such as combining, integrating, subtracting, false colouring, edge enhancing, and other processing known to the skilled artisan. In addition, automated recognition processes (e.g. as used for particle analysis) may be included in such processing.

Also depicted is a vacuum port 7', which may be opened so as to introduce/remove items (components, specimens) to/from the interior of vacuum chamber 7, or onto which, for example, an ancillary device/module may be mounted (not depicted). A microscope 1 may comprise a plurality of such ports 7', if desired.

In the context of the current invention, the microscope 1 can also comprise an in situ CT module 7" as shown in FIG. 5B. In this figure, the CPM's specimen holder 9 has been provided with a metal target 13', which is positioned (using actuator 11) so that electron beam 5 impinges upon it, thus producing Bremsstrahlung X-rays in a variety of directions. The Figure shows a beam B of such X-rays that propagate to one side from target 13' (effective source Sx) into module 7", where they pass through a specimen S and impinge upon a detector D: compare to FIG. 1. The specimen S is mounted on a stage apparatus A that allows the specimen S to be positioned/moved (typically translated and rotated) relative to the source Sx.

Such a CT module 7" may be permanently present (ab initio) in the vacuum enclosure 7, or it may be an add-on module that can be mounted (post-manufacture of the CPM 1) on/within a spare vacuum port 7', for example.

The invention claimed is:

1. A method of investigating a specimen using a tomographic imaging apparatus comprising:
   a specimen holder, for holding the specimen;
   a source, for producing a beam of radiation that can be directed at the specimen;
   a detector, for detecting a flux of radiation transmitted through the specimen from the source;
   a stage apparatus, for producing relative motion of the source with respect to the specimen, so as to allow the source and detector to image the specimen along a series of different viewing axes; and
   a processing apparatus, for assembling output from the detector into a tomographic image of at least part of the specimen,
   the method comprising:
      acquiring a first set of input images of the specimen, each input image being acquired while maintaining the source at a different position relative to the specimen, wherein the different positions are intended to lie on an ideal locus but instead lie on a distorted locus as a result of positioning error;
      using said input images to construct an initial tomographic image;
      dissociating said initial tomographic image into a second set of images and forward projecting the second set of images onto the ideal locus as a third set of reference images, the reference images corresponding to different input images of the first set of input images, wherein a collection of first features shown in at least a subset of the input images is also present in the reference images corresponding to the subset, and wherein each first feature is:
         associated with a positional error that indicates a positional deviation between representations of the first feature in a corresponding pair of input and reference images, and
         sufficiently small in size that the positional deviation for each first feature is observable and quantifiable from a comparison of the representations of the first feature in the corresponding pair of input and reference images;
      determining the positional errors for the collection of first features by performing the comparisons and quantifying the positional deviations observed therefrom;
      using the positional errors to calculate a set of transformations by which input images of the first set of input images can be mapped onto corresponding reference images; and
      using said set of transformations to construct a modified tomographic image.

2. The method of claim 1, wherein the method is repeated in iterative cycles, the modified tomographic image emerging from a preceding cycle being used as the initial tomographic image entering a subsequent cycle.

3. The method of claim 2, wherein the set of transformations are used in an intermediate step to produce a set of corrected input images, which are then used to construct the modified tomographic image; and wherein image reconstruction occurs with the aid of a filtered back projection technique.

4. The method of claim 2, wherein the set of transformations are used to construct the modified tomographic image without first producing a set of corrected input images in an intermediate step, and wherein image reconstruction occurs with the aid of an iterative reconstruction technique.

5. The method of claim 1, wherein the set of transformations are used in an intermediate step to produce a set of corrected input images, which are then used to construct the modified tomographic image, and wherein image reconstruction occurs with the aid of a Filtered Back Projection technique.

6. The method of claim 1, wherein the set of transformations are used to construct the modified tomographic image without first producing a set of corrected input images in an intermediate step, and wherein image reconstruction occurs with the aid of an iterative reconstruction technique.

7. The method of claim 1, wherein the ideal locus comprises a helical path through the volume of the specimen.

8. The method of claim 1, further comprising at least one of the following steps:
   downsampling the input images before using the input images to construct the initial tomographic image; and
   coarsening the initial tomographic image before dissociating the initial tomographic image into the second set of images.

9. The method of claim 1, wherein the set of transformations comprises a correction to the distorted locus used when constructing the modified tomographic image.

10. A tomographic imaging apparatus comprising:
   a specimen holder, for holding a specimen;
   a source, for producing a beam of radiation that can be directed at the specimen;
   a detector, for detecting a flux of radiation transmitted through the specimen from the source;
   a stage apparatus, for producing relative motion of the source with respect to the specimen, so as to allow the source and detector to image the specimen along a series of different viewing axes; and
   a processing apparatus, for assembling output from the detector into a tomographic image of at least part of the specimen,
   said processing apparatus programmed to perform the following steps:

acquire a first set of input images of the specimen, wherein the source is maintained at a different position relative to the specimen for each acquisition of one of the input images, wherein the different positions are intended to lie on an ideal locus but instead lie on a distorted locus as a result of positioning error;

use said input images to construct an initial tomographic image;

dissociate said initial tomographic image into a second set of images and forward project the second set of images onto the ideal locus as a third set of reference images, the reference images corresponding to different input images of the first set of input images, wherein a collection of first features shown in at least a subset of the input images is also present in the reference images corresponding to the subset, and wherein each first feature is:

associated with a positional error that manifests as a positional deviation between representations of the first feature in a corresponding pair of input and reference images, and sufficiently small in size that the positional deviation for each first feature is observable and quantifiable from a comparison of the representations of the first feature in the corresponding pair of input and reference images;

determine the positional errors for the collection of first features by performing the comparisons and quantifying the positional deviations observed therefrom;

use the positional errors to calculate a set of transformations by which input images of the first set of images can be mapped onto corresponding reference images; and use said set of transformations to construct a modified tomographic image.

11. A charged-particle microscope comprising a tomographic imaging apparatus as claimed in claim 10.

12. The apparatus of claim 10, wherein the processing apparatus is further adapted to perform iterative cycles, using the modified tomographic image from a preceding cycle as the initial tomographic image in a subsequent cycle.

13. The apparatus of claim 10, further comprising downsampling the input images before using the input images to construct the initial tomographic image.

14. The tomographic imaging apparatus of claim 10, wherein the step of forward projection of the second set of images onto the ideal locus as a third set of reference images comprises:

selecting second features in the initial tomographic image large enough for proportions of the second features appear substantially the same in both the input images and the third set of reference images; and anchoring the second features in the reference images to the same coordinates occupied by the second features in the input images.

15. The tomographic imaging apparatus of claim 14, wherein the first features are edges of the second features.

16. A micro CT (computed tomography) instrument comprising the tomographic imaging apparatus of claim 10.

17. The micro CT of claim 16, wherein the positioning error comprises multi-micron positional deviations between corresponding points on the ideal and distorted loci.

18. A method of investigating a specimen using a-tomographic imaging, comprising:

acquiring a first set of input images of the specimen by directing a beam of radiation at the specimen from a radiation source, each input image being acquired while maintaining the radiation source at a different position relative to the specimen, wherein the different positions are intended to lie on an ideal locus but instead lie on a distorted locus as a result of positioning error;

constructing an initial tomographic image using said input images;

dissociating said initial tomographic image into a second set of images and forward projecting the second set of images onto the ideal locus as a third set of reference images, the reference images corresponding to different input images of the first set of input images;

determining positional errors for a collection of first features that are present in at least a subset of the input images, wherein the positional error for each first feature is determined from a comparison of corresponding representations of the first feature shown in a corresponding pair of input and reference images;

using the positional errors to calculate a set of transformations by which input images of the first set of input images can be mapped onto corresponding reference images; and constructing a modified tomographic image using said set of transformations.

19. The method of claim 18, wherein:

the initial tomographic image comprises second features, wherein the second features are large in size, such that the proportions of the second features are substantially the same in both the input images and the reference images; and forward projecting the second set of images onto the ideal locus as a third set of reference images comprises aligning images of the second features in the second set of images with images of the second features in the first set of input images.

20. The method of claim 18, wherein:

the positional error for each first feature manifests in the comparison of corresponding representations of the first feature as a positional deviation between the same; and each first feature is sufficiently small in size that the positional deviation between the compared representations of the first feature manifests to a degree that is quantifiable, further comprising quantifying the positional deviations as values of the positional errors.

* * * * *